United States Patent
Pokkuluri et al.

(10) Patent No.: US 12,355,753 B2
(45) Date of Patent: Jul. 8, 2025

(54) USING A HIDDEN WEBVIEW UNDER THE CONTROL OF A MOBILE APP TO MAINTAIN AN AUTHENTICATED SESSION BETWEEN THE MOBILE APP AND A BACKEND RESOURCE

(71) Applicant: Providence St. Joseph Health, Renton, WA (US)

(72) Inventors: Suresh Pokkuluri, Lynnwood, WA (US); Sandeep Kumar Polu, Everett, WA (US); Theodore Newell, Seattle, WA (US); Barry E. Tolnas, Seattle, WA (US); Shivudu Bhuvanagiri, Bothell, WA (US); Joshua Mari G Lansang, Seattle, WA (US)

(73) Assignee: Praia Health Inc., Renton, WA (US)

( * ) Notice: Subject to any disclaimer, the term of this patent is extended or adjusted under 35 U.S.C. 154(b) by 48 days.

(21) Appl. No.: 18/296,122

(22) Filed: Apr. 5, 2023

(65) Prior Publication Data
US 2024/0340276 A1     Oct. 10, 2024

(51) Int. Cl.
H04L 9/40     (2022.01)
(52) U.S. Cl.
CPC ........ H04L 63/0815 (2013.01); H04L 63/083 (2013.01); H04L 63/0861 (2013.01)
(58) Field of Classification Search
CPC ............... H04L 63/0815; H04L 63/083; H04L 63/0861
USPC .......................................................... 726/4
See application file for complete search history.

(56) References Cited

U.S. PATENT DOCUMENTS

| 9,787,665 B2 | 10/2017 | Korat et al. |
| 2014/0109177 A1 | 4/2014 | Barton et al. |
| 2018/0198845 A1* | 7/2018 | Kulp ........................ G06F 9/54 |
| 2020/0137042 A1 | 4/2020 | Kannan et al. |
| 2020/0213297 A1 | 7/2020 | Suraparaju |
| 2023/0014970 A1* | 1/2023 | Gujarathi ................ H04L 63/10 |

FOREIGN PATENT DOCUMENTS

KR     10-2018-0034199 A     4/2018

OTHER PUBLICATIONS

Characterization of web single sign-on protocols, Victoria Beltran, Jul. 2016 (Year: 2016).*
Multi-factor Authentication as a Service, Shah et al, Mar. 2015 (Year: 2015).*
Single Sign-On: A Solution Approach to Address Inefficiencies During Sign-Out Process, Ramamoorthi et al, Jan. 2020 (Year: 2020).*
International Search Report and Written Opinion of the International Searching Authority, International Application No. PCT/US2024/023049, mailed Jul. 17, 2024, 7 pages.

* cited by examiner

*Primary Examiner* — Jahangir Kabir
(74) *Attorney, Agent, or Firm* — Seed Intellectual Property Law Group LLP

(57) ABSTRACT

A facility for securely accessing a backend resource from a mobile app is described. In a hidden webview of the mobile app, the facility (1) sends a first request with respect to a remote backend resource on behalf of a user for whom a distinguished user account was established with a backend service; the sending is performed in such a way that active SSO session state information stored in the hidden webview of the mobile app is attached to the first request; and (2) receives in response to the first request a first response acknowledging user signin at the backend resource.

17 Claims, 6 Drawing Sheets

USING A HIDDEN WEBVIEW UNDER THE CONTROL OF A MOBILE APP TO MAINTAIN AN AUTHENTICATED SESSION BETWEEN THE MOBILE APP AND A BACKEND RESOURCE

BACKGROUND

Mobile apps are programs that execute on mobile devices, such as smartphones, tablets, wearable devices, etc. Some mobile apps are designed to provide authenticated access to a backend resource, such as a data store or processing engine hosted on a separate server, in which the identity to the mobile app's user is verified before such access is provided. As one example, a user may be authenticated based on inputting a username and password established for the user with the mobile app and/or the backend resource. A user may also be authenticated by providing biometric information, such as fingerprint, face image, voice sample, etc.

This identify authentication can be performed in a number of ways, including (1) in the backend resource itself; (2) in a "gatekeeper" device physically interposed in the communication path between the mobile app and the backend resource; and (3) in an independent authentication service—sometimes called a "single signon service," "SSO service," or "SSO"—that returns authentication result credentials to mobile app, which the mobile app uses to satisfy the backend resource or gatekeeper device that the mobile app's user is authenticated.

DETAILED DESCRIPTION

Figure 1:
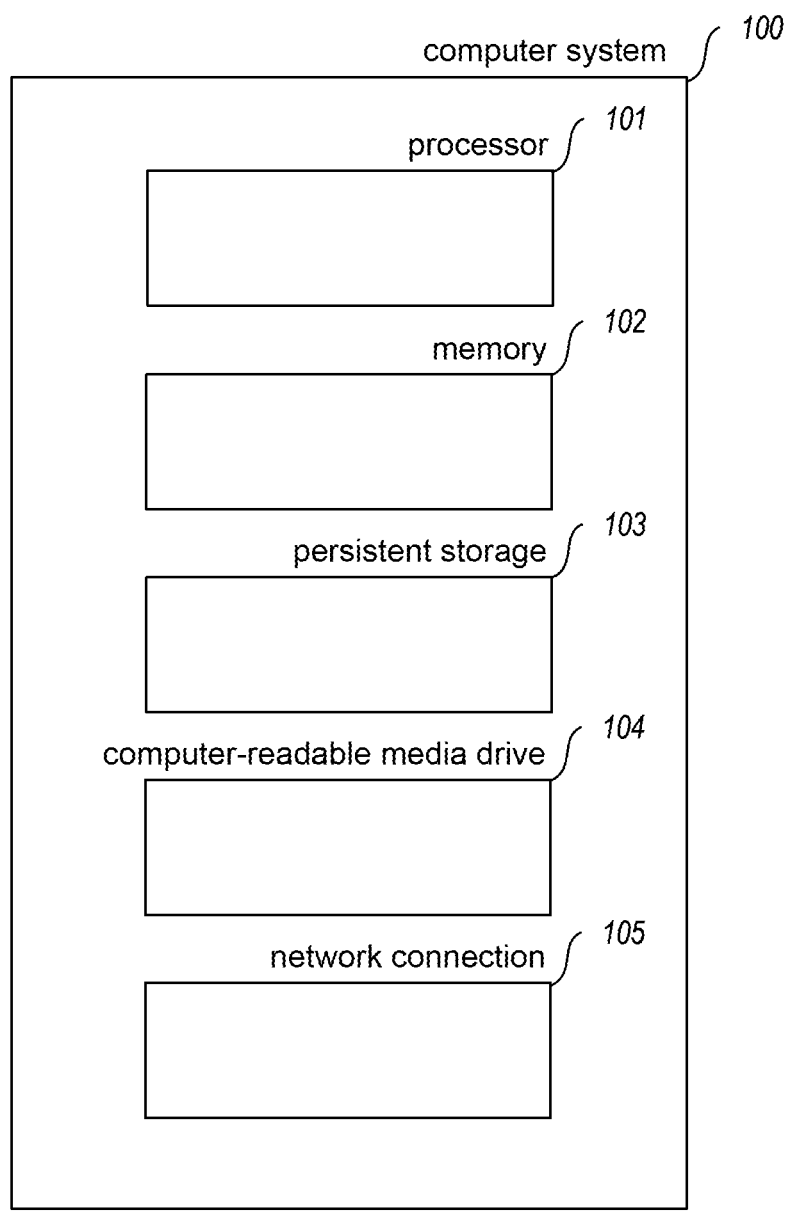
FIG. 1 is a block diagram showing some of the components typically incorporated in at least some of the computer systems and other devices on which the facility operates.

The inventors have recognized that, in conventional mobile app user authentication processes, for some combinations of authentication services and backend resources, the most common architectures for implementing mobile apps limit the amount of time for which the mobile app is able to maintain a session with the backend resources that is based on authentication result credentials provided by the authentication service. This means that a user who wants to continue to use the mobile app to access the backend resource must often repeat the authentication process with the authentication service to obtain new authentication result credentials to present to the backend resource.

While the inventors are aware of authentication architectures that are at least somewhat more successful at maintaining session state between the mobile app and the backend resources, these add significant complexity and additional hardware and software resource requirements, which additionally introduce further cost, failure, maintenance burden, and latency concerns.

In response to recognizing the above disadvantages of conventional mobile app user authentication processes, the inventors have conceived and reduced to practice a software and/or hardware facility for using a hidden webview under the control of a mobile app to maintain an authenticated session between the mobile app and a backend resource ("the facility").

The facility first causes the app to establish an embedded webview, which in turn establishes an SSO session with the SSO service. As part of the SSO session, the SSO service solicits a username and password from the user. In various embodiments, this username/password pair is one created for the user with the backend resource, or one created for the user to use the SSO service, as examples. In response to the request containing the username/password pair, the SSO service returns authentication result credentials, in some embodiments the following Open ID Connect tokens, sometimes expressed as JSON Web Tokens: an access token, a refresh token, and an ID token. Among these, the access token connotes access to one or more resources; the refresh token is a long-lived token usable to obtain a renewed access token; and the ID token encodes information about the user's identity. The embedded webview stores these authentication result credentials in secure storage accessible only to the app, and transfers control within the app to the dashboard, and in particular to a hidden webview hosted by the dashboard.

The hidden webview first signs out of the backend resource, to ensure that any preexisting state for any previous backend resource sessions is fully cleared from the hidden webview. In some embodiments, the facility performs this signout operation with the backend resource by calling a Security Assertion Markup Language ("SAML") single logout function against the backend resource. In response to this signout operation, the backend resource sends a response to the hidden webview that clears any retained backend resource session state, and directs the hidden webview to perform an SSO login with the SSO service. The hidden webview then does this, in some embodiments by calling an authorize function against the SSO service, passing as part of the call the access token and/or ID token received earlier from the SSO service and stored in the secure storage. The SSO service's response to this call causes the state for a SSO session to be established in the hidden webview. The hidden webview then performs a signin operation with the backend resource, such as by calling a SAML login function against the backend resource, passing as part of the call state of the new SSO session. The backend resource communicates with the SSO service to verify the SSO session, and, in some cases, obtain identifying information for the user that is meaningful to the backend resource, such as backend resource username or user ID. The backend resource's response to this call contains information about the new backend resource session, such as a proprietary session security token for the backend resource—in some cases an EPIC Lucy token—and the user's backend resource username. The facility causes the hidden webview to store this returned information as state of the new backend service session.

In some embodiments, the app's dashboard uses the Lucy token stored in its hidden webview as an authorization credential for directly calling the backend resource, such as the EPIC myChart backend resource. In some embodiments, the app's dashboard incorporates a backend resource SDK component that locally implements an API of the backend resource, in many cases by relaying invocations to an interconnect server for the backend resource that acts as an intermediary between the mobile device and the backend resource. In some such embodiments, when the dashboard invokes a method of the API against the backend resource SDK component, the SDK component in turn calls to the interconnect service, passing in the Lucy token, and receives in return a backend resource token to be used as an authorization credential for calling the backend resource—such an EPIC myChart SDK token—either via the present or future SDK component method invocations or directly.

In some embodiments, instead of or in addition to using a username/password coordination to authenticate a user, the facility uses biometric information provided by the user.

By operating in some or all of the ways described above, the facility establishes a more robust and secure mechanism for protecting and granting access to a backend resource. Also, relative to conventional approaches, the facility allows a mobile app to access the backend resource without having to perform user login operations as frequently. Further, the facility obviates one or more additional connector components between the mobile app, SSO service, and backend resource, including the design, development, testing, and maintenance of such additional connector components.

Additionally, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with lesser latency, and/or preserving more of the conserved resources for use in performing other tasks. For example, by eliminating connector components, the facility can avoid allocating computing systems to execute those connector components, and incurring network traffic to communicate with them. Similarly, by reducing the frequency of user login operations, the facility obviates the use of network and processing resources that would have been consumed by the omitted user login operations.

FIG. 1 is a block diagram showing some of the components typically incorporated in at least some of the computer systems and other devices on which the facility operates. In various embodiments, these computer systems and other devices 100 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 101 for executing computer programs and/or training or applying machine learning models, such as a CPU, GPU, TPU, NNP, FPGA, or ASIC; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
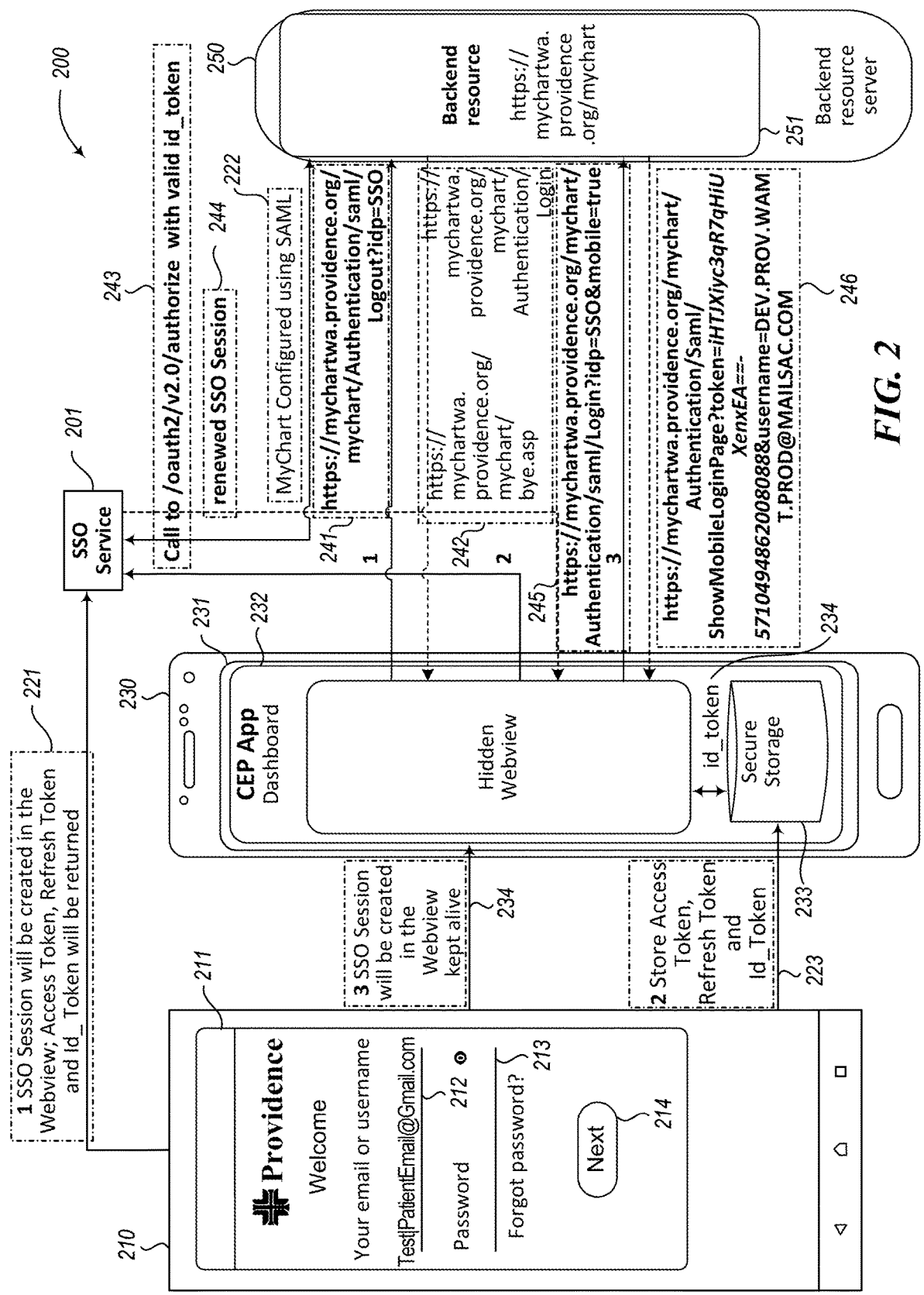
FIG. 2 is a first data flow diagram showing operation of the facility in some embodiments to create and maintain an authentications session for accessing a backend resource based on a username/password combination.

FIG. 2 is a first data flow diagram showing operation of the facility in some embodiments to create and maintain an authentications session for accessing a backend resource based on a username/password combination. The diagram shows a data flow 200 in which an app 210 executing a mobile device establishes an embedded webview 211. The facility causes the embedded webview to establish an SSO session with the SSO service 201. In some embodiments, the SSO service is the Azure Active Directory B2C SSO service from Microsoft Corporation. The SSO service causes the webview to display a signin page, including a username field 212, a password field 213, and a next control 214 for the user to activate after populating their username and password. The embedded webview passes these to the SSO service, which establishes an SSO session with the webview by returning authentication result credentials, such as an access token, a refresh token, and an ID token. The embedded webview stores these authentication result credentials in secure storage 233 accessible only to the app and its constituent components. The embedded webview further transfers control within the app to the app's dashboard 231, and in particular a hidden webview 232 that is hosted by the dashboard 231.

Figure 6:
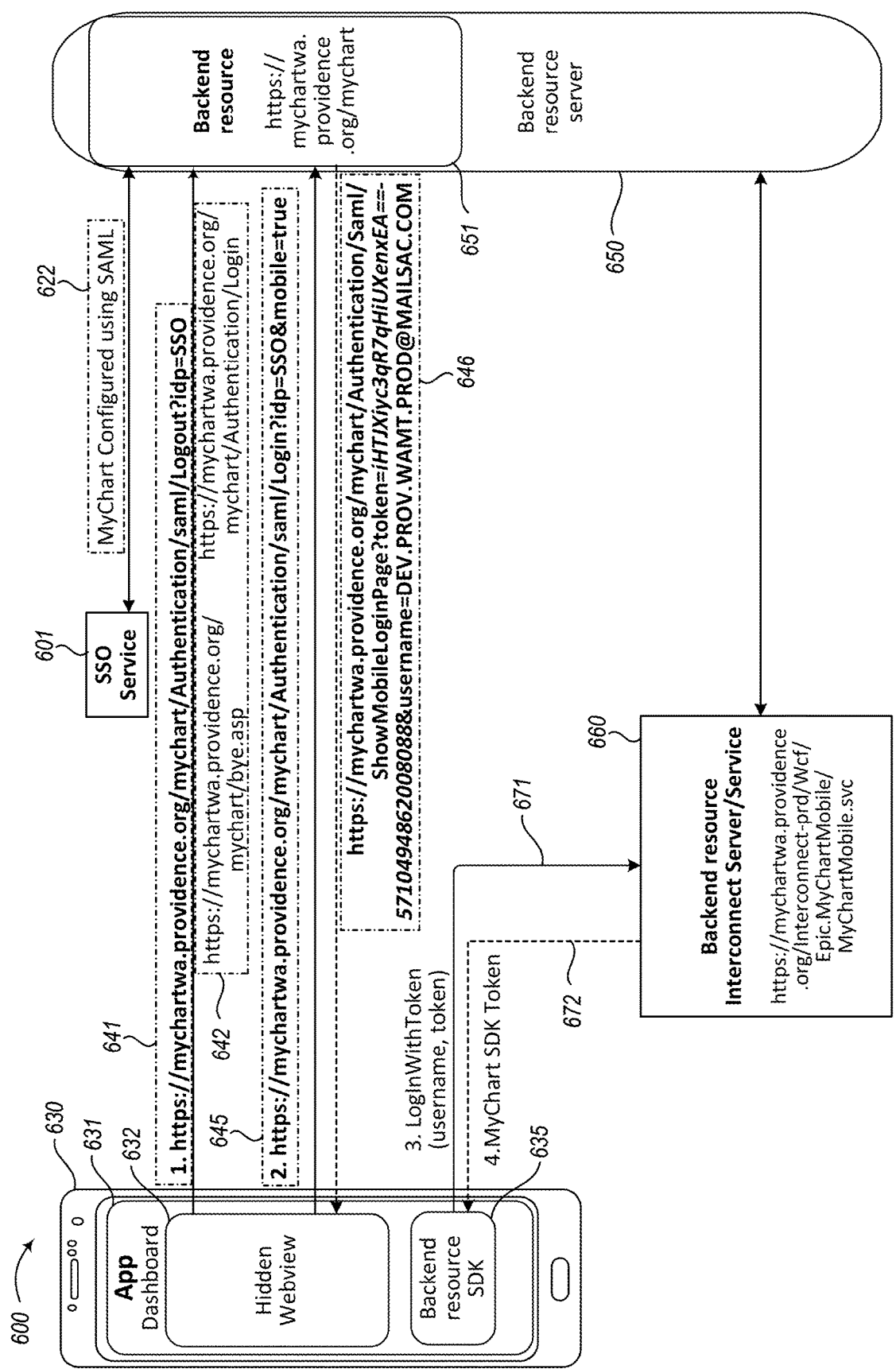
FIG. 6 is a data flow diagram showing operation of the facility in some embodiments to create and maintain an authenticated session for accessing a backend resource using a backend resource interconnect service.

The hidden webview first sends a signout request 241 to the backend resource 251 on a backend resource server 250. In some embodiments, the backend resource is an instance of the myChart patient access module of the Epic electronic medical record ("EMR") software package that executes on a virtual or physical server dedicated to the Epic EMR software package. In response, the backend resource sends a response 242 to the hidden webview that clears any retained backend resource session state, and directs the hidden webview to perform an SSO login with SSO service. The hidden webview makes this SSO login request 243, passing and ID token 234 retrieved by the hidden webview from secure storage. In response, the SSO service sends a response 244 containing the state of a renewed SSO session for the hidden webview. The hidden webview then sends a signin request 245 to the backend resource passing the state of the new SSO session received from the SSO service as part of the request. The backend resource communicates 222 with the SSO service to verify the SSO session of the hidden webview, in some cases obtaining identifying information for the user that is relevant to the backend resource from the SSO service. The backend resource sends a response 246 to this request containing information about the new backend resource session created in response to the request, such as a security token for the backend resource like an EPIC Lucy token, as well as a username that identifies the user to the backend resource. The hidden webview stores this return information as the state of the new backend service session. In some embodiments, this backend resource session state is used by the hidden webview directly to make substantive requests of the backend resources. In some embodiments, the app performs additional processing to obtain and employ additional credentials using the backend resource session state, that in turn it uses to make substantive requests of the backend resource. This additional processing is shown in FIG. 6 and described below.

Those skilled in the art will appreciate that the acts shown in FIG. 2 and in each of the data flow diagrams discussed below may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 3:
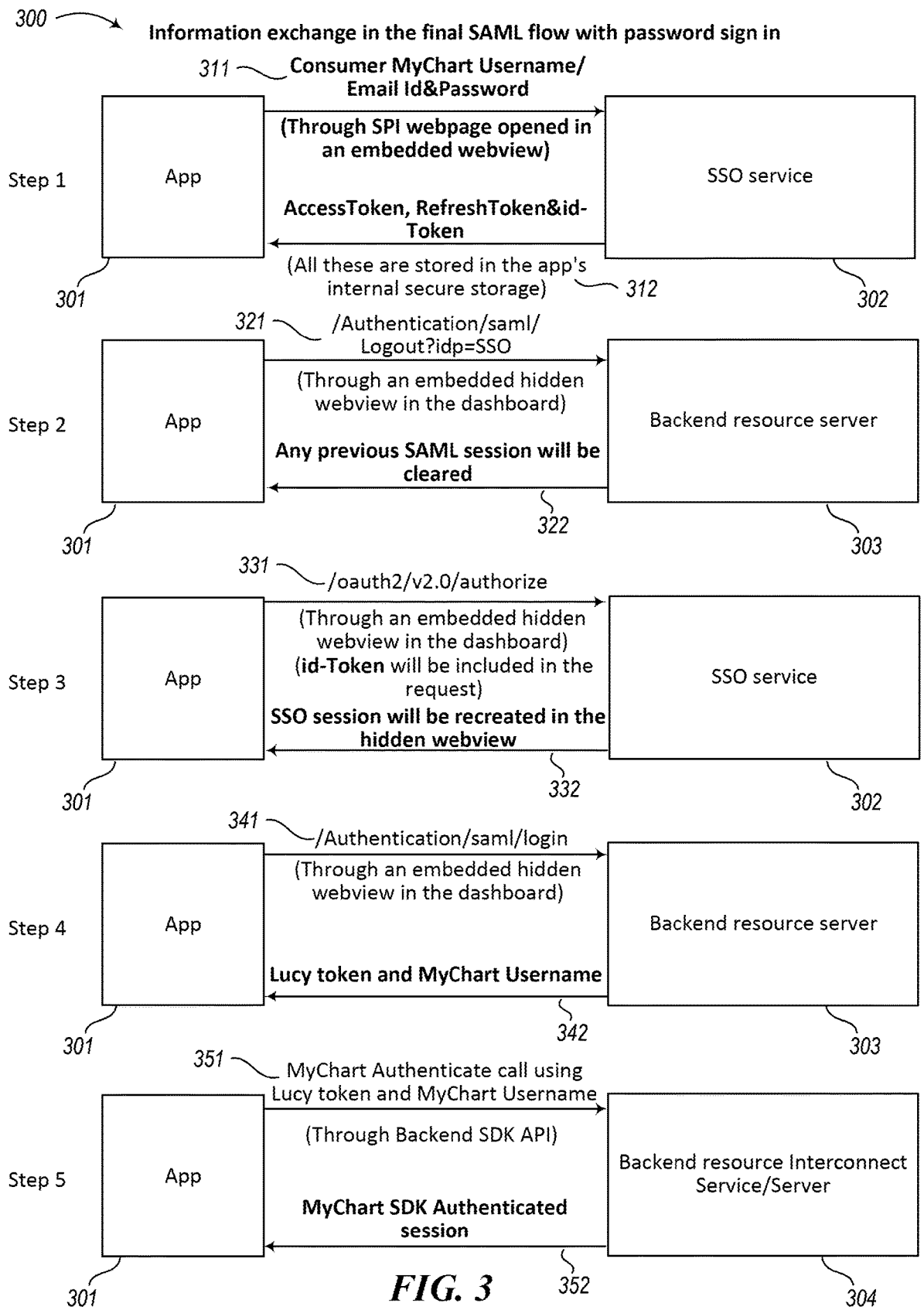
FIG. 3 is a second data flow diagram showing operation of the facility in some embodiments to create and maintain and authenticated session for accessing a backend resource based on a username/password combination.

FIG. 3 is a second data flow diagram showing operation of the facility in some embodiments to create and maintain and authenticated session for accessing a backend resource based on a username/password combination. The data flow 300 shows the app 301, via its embedded webview, sending a request 311 to establish an SSO session. In some embodiments, this request contains identifying information for the user, such as the user's username and password. The SSO service 302 sends a response 312 to the request, including the following authentication result credentials representing the SSO session: an access token, a refresh token and an ID token. The app stores these returned authentication result credentials in the app's internal secure storage. Through the app's hidden webview in its dashboard, the app sends a logout request 321 to the backend resource server 303. The backend resource server sends a response 322 to the app to clear from the hidden webview the state of any previous SAML backend resource session. The app then sends via the hidden webview an SSO login request 331 to the SSO service enclosing the ID token retrieved from the app's internal secure storage such as an Azure Authorize SSO login request. The response 332 sent by the SSO service contains state of a recreated SSO session to be stored in the hidden webview. The app then sends a login request 341 to the backend resource server, whose response 342 contains the backend resource user ID for the user, as well as a proprietary session security token for the backend resource, such as a Lucy token. The app then sends, via a backend SDK incorporated in the app, a backend authenticate request, passing the backend resource session credentials, such as backend user ID and Lucy token. In response, the backend resource interconnect service 304 that receives the request sends a response 352 containing state of and authenticated session for the backend SDK.

Figure 4:
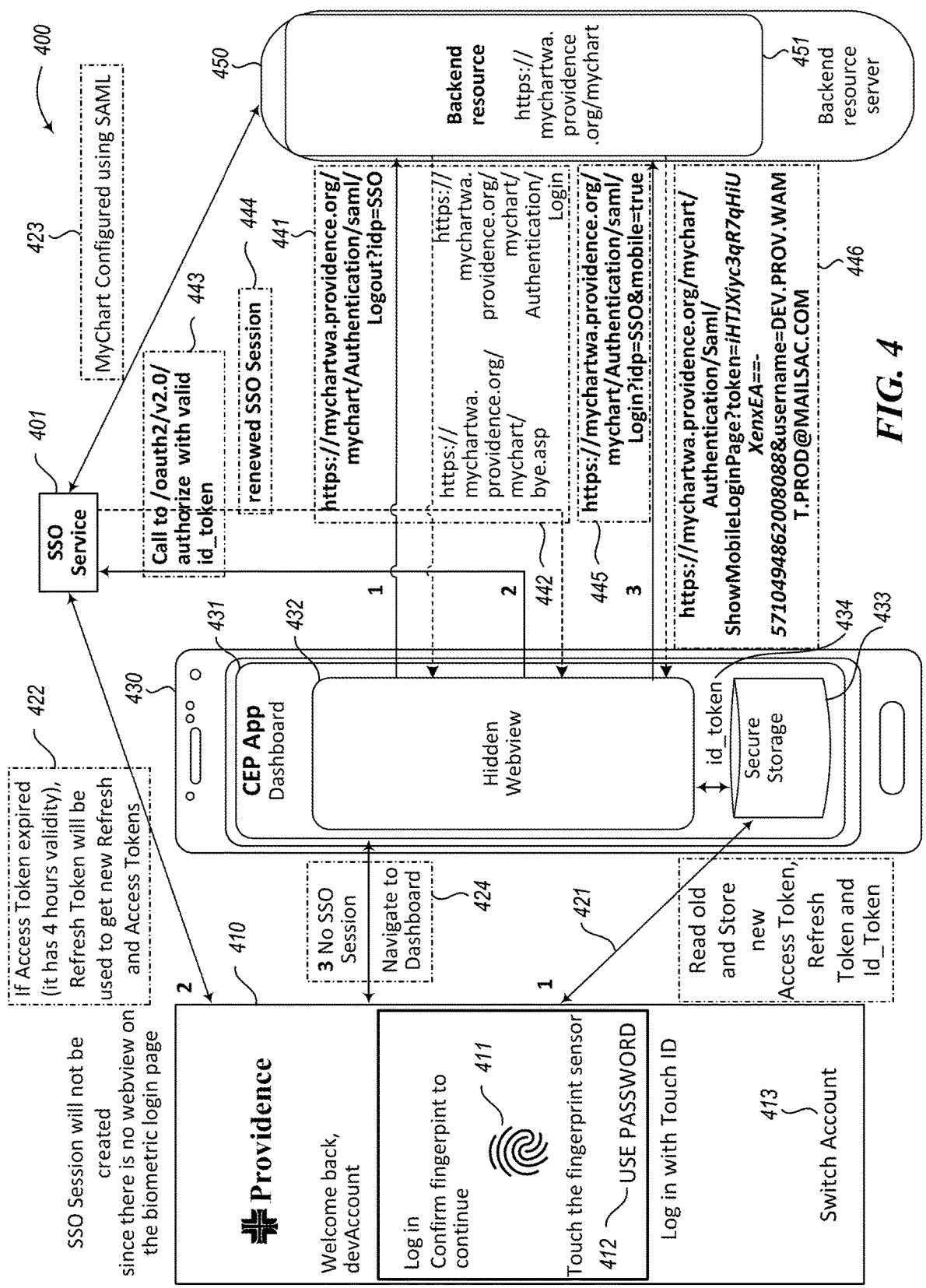
FIG. 4 is a first data flow diagram showing operation of the facility in some embodiments to create and maintain an authenticated session for accessing a backend resource based on a biometric input of the user.

FIG. 4 is a first data flow diagram showing operation of the facility in some embodiments to create and maintain an authenticated session for accessing a backend resource based on a biometric input of the user. The data flow 400 is generally similar to data flow 200, shown in FIG. 2. It can be seen that the app 410 presents a display adapted to biometric login, including a request 411 that the user provide biometric information such as their fingerprint by touching the finger sensor. In some embodiments, the display also includes a control 412 that the user can activate in order to login using username and password instead, as well as a control 413 that the user can activate in order to use biometric login for a different account than shown at the top of the display.

Figure 5:
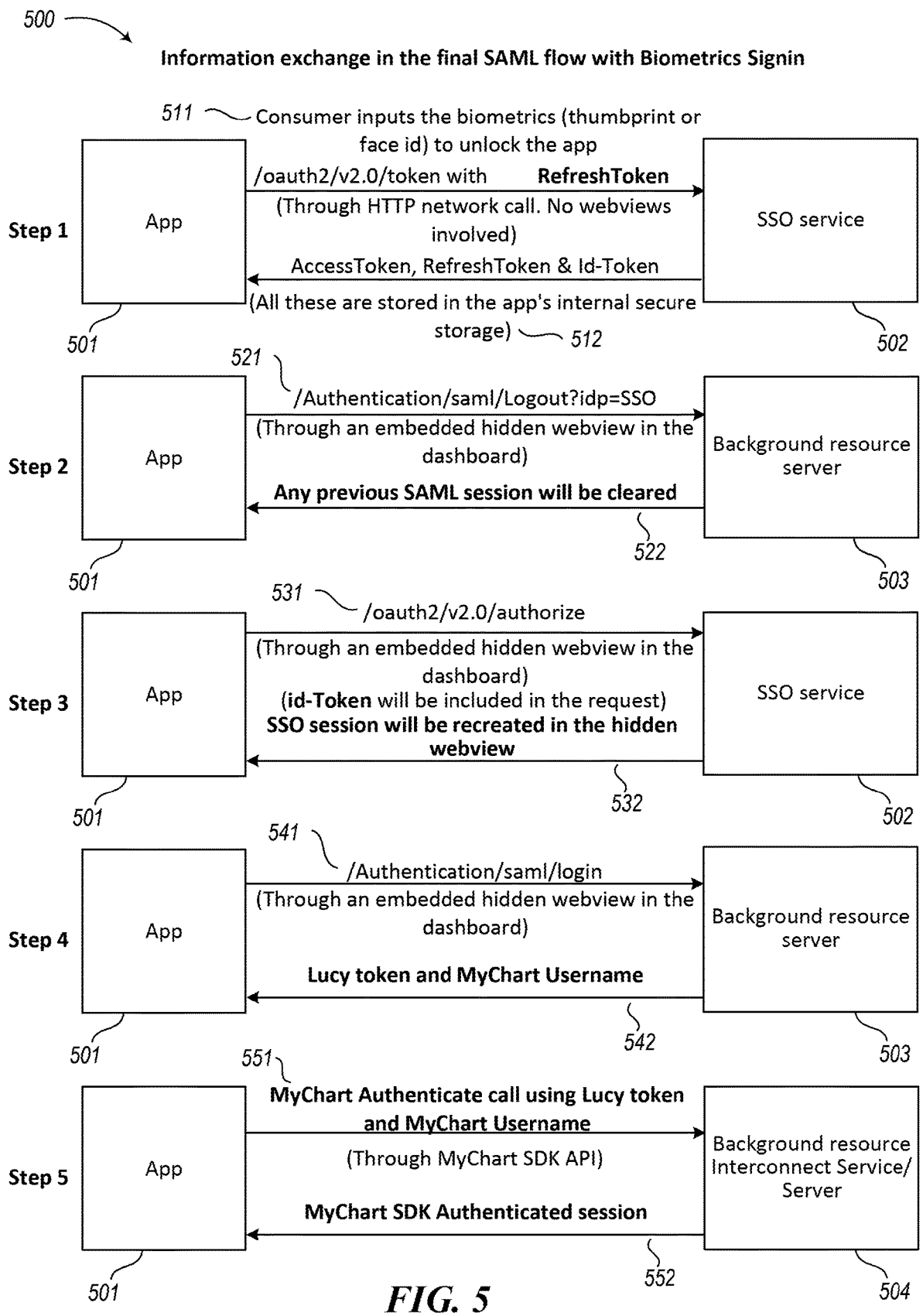
FIG. 5 is a second data flow diagram showing operation of the facility in some embodiments to create and maintain an authenticated session to accessing a backend resource based on biometric input of the user.

FIG. 5 is a second data flow diagram showing operation of the facility in some embodiments to create and maintain an authenticated session to accessing a backend resource based on biometric input of the user. Data flow 500 is generally similar to data flow 300, shown in FIG. 3. It can be seen that the data flow is adapted to the use of biometric login by, an SSO session establishment request 511 passing the refresh token together with biometric information, rather than username and password.

FIG. 6 is a data flow diagram showing operation of the facility in some embodiments to create and maintain an authenticated session for accessing a backend resource using a backend resource interconnect service. The data flow 600 is generally similar to data flow 200 shown in FIG. 2. Additionally, a backend resource SDK component 635 is included in the app's dashboard. For example, in some embodiments, the backend resource SDK component is an Epic MyChart SDK component. The SDK provides to the app local implementation of an SDK established for making use of the backend resource. When called, the SDK component sends a login request 671 to a backend resource interconnect service 660 running on a backend resource interconnect server. The request encloses the user's username as well as the Lucy token received from the backend resource in response 646. The backend resource interconnect service sends a response 672 containing a backend SDK token, which the app can subsequently use to perform methods against the SDK API for making substantive requests of the backend resource.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method in a computing system, comprising:
   in a mobile application (mobile app):
   sending a first request, the first request being to login to an SSO service, the first request including authentication credentials for a user;
   receiving in response to the first request a first response containing one or more SSO authentication result credentials;
   causing the received one or more SSO authentication result credentials to be stored in a manner making them accessible only to the mobile app;
   establishing the hidden webview of the mobile app in a manner that permits it to access the stored SSO authentication result credentials;
   in the hidden webview of the mobile app:
   sending a second request with respect to a remote backend resource, the second request being on behalf of the user for whom a distinguished user account was established with the backend resource, wherein the sending is performed in such a way that the active SSO session state information stored in the hidden webview of the mobile app is attached to the second request;
   receiving in response to the second request a second response acknowledging user signin at the backend resource;

sending a third request, the third request specifying to logout of the remote backend resource;

receiving in response to the third request a third response acknowledging user signout at the backend resource, and clearing state of any previous remote backend resource session within the hidden webview of the mobile app;

sending a fourth request, the fourth request being to begin a session with the SSO service, the fourth request including at least a portion of the one or more SSO authentication result credentials; and receiving in response to the fourth request a fourth response containing the active SSO session state information, in such a way that the received active SSO session state information stored in the hidden webview of the mobile app.

2. The method of claim 1 wherein the received second response contains a backend session security token, the method further comprising in the mobile app:

sending a fifth request with respect to the backend service, the fifth request being on behalf of the user, wherein the sending is performed in such a way that the backend session security token is attached to the fifth request; and receiving in response to the fifth request a fifth response acknowledging operation of the backend resource with respect to the user.

3. The method of claim 1 wherein the received fourth response contains a backend session security token, the method further comprising in the mobile app:

invoking a local SDK component associated with the backend resource, passing to the SDK component backend session security token as part of the invocation; and in response to the invocation, outputting content procured by the local SDK component from the backend response using the backend session security token.

4. The method of claim 3 wherein the local SDK component uses the backend session security token to obtain a backend SDK token, and wherein the local SDK component uses the backend SDK token to invoke a remote SDK token of the backend resource to generate the outputted content.

5. One or more instances of computer-readable media collectively having contents executable by a computing system to perform actions, the actions comprising:

in a mobile application (mobile app), in a hidden webview of the mobile app:

sending a first request with respect to a remote backend resource, the first request being on behalf of a user for whom a distinguished user account was established with the backend resource, wherein the sending is performed in such a way that the active SSO session state information stored in the hidden webview of the mobile app is attached to the first request; and receiving in response to the first request a first response acknowledging user signin at the backend resource;

in the mobile app, before sending the first request:

sending a second request, the second request being to login to an SSO service, the second request including authentication credentials for the user;

receiving in response to the second request a second response containing one or more SSO authentication result credentials;

causing the received one or more SSO authentication result credentials to be stored in a manner making them accessible only to the mobile app;

establishing the hidden webview of the mobile app in a manner that permits it to access the stored SSO authentication result credentials;

in the hidden webview of the mobile app, before sending the first request, after receiving the second response;

sending a third request, the third request specifying to logout of the remote backend resource;

receiving in response to the third request a third response acknowledging user signout at the backend resource, and clearing state of any previous remote backend resource session within the hidden webview of the mobile app;

sending a fourth request, the fourth request being to begin a session with the SSO service, the fourth request including at least a portion of the one or more SSO authentication result credentials; and receiving in response to the fourth request a fourth response containing the active SSO session state information, in such a way that the received active SSO session state information stored in the hidden webview of the mobile app.

6. The one or more instances of computer-readable media of claim 5 wherein the second request is sent by an SSO webview of the mobile app.

7. The one or more instances of computer-readable media of claim 5 wherein the third request is a SAML single logout.

8. The one or more instances of computer-readable media of claim 5 wherein the authentication credentials included in the second request comprise one or both of:

a username and password combination for the user, and
biometric information captured from the user.

9. The one or more instances of computer-readable media of claim 5 wherein the SSO authentication result credentials received in the second response comprise some or all of:

an Open ID Connect access token,
an Open ID Connect refresh token, and
an Open ID Connect ID token.

10. The one or more instances of computer-readable media of claim 5 wherein the received first response contains a backend session security token, the actions further comprising in the mobile app:

sending a second request with respect to a remote backend service, the second request being on behalf of the user for whom the distinguished user account was established with the backend service, wherein the sending is performed in such a way that the backend session security token is attached to the second request; and receiving in response to the second request a second response acknowledging operation of the backend resource with respect to the user.

11. The one or more instances of computer-readable media of claim 5 wherein the received first response contains a backend session security token, the actions further comprising in the mobile app:

invoking a local SDK component associated with the backend resource, passing to the SDK component backend session security token as part of the invocation; and in response to the invocation, outputting content procured by the local SDK component from the backend response using the backend session security token.

12. The one or more instances of computer-readable media of claim 11 wherein the local SDK component uses the backend session security token to obtain a backend SDK token, and wherein the local SDK component uses the backend SDK token to invoke a remote SDK token of the backend resource to generate the outputted content.

13. A method in a computing system, comprising:

in a mobile application (mobile app):

sending a first request, the first request being to login to an SSO service, the first request including authentication credentials for a user;

receiving in response to the first request a first response containing one or more SSO authentication result credentials;

causing the received one or more SSO authentication result credentials to be stored in a manner making them accessible only to the mobile app;

establishing a hidden webview of the mobile app in a manner that permits it to access the stored SSO authentication result credentials;

in the hidden webview of the mobile app, after receiving the first response:

sending a second request, the second request specifying to logout of a remote backend resource;

receiving in response to the second request a second response acknowledging user signout at the backend resource, and clearing state of any previous remote backend resource session within the hidden webview of the mobile app;

sending a third request, the third request being to begin a session with the SSO service, the third request including at least a portion of the one or more SSO authentication result credentials; and receiving in response to the third request a third response containing the active SSO session state information, in such a way that the received active SSO session state information stored in the hidden webview of the mobile app.

14. The method of claim 13 wherein the first request is sent by an SSO webview of the mobile app.

15. The method of claim 13 wherein the second request is a SAML single logout.

16. The method of claim 13 wherein the authentication credentials included in the first request comprise one or both of:

a username and password combination for the user, and biometric information captured from the user.

17. The method of claim 13 the SSO authentication result credentials received in the first response comprise some or all of:

an Open ID Connect access token,
an Open ID Connect refresh token, and
an Open ID Connect ID token.

* * * * *